United States Patent
Murphy et al.

[19]

[11] Patent Number: 6,032,705
[45] Date of Patent: Mar. 7, 2000

[54] CLOSED DELIVERY SYSTEM

[75] Inventors: William J. Murphy, Hinsdale; Leon M. Levy, Chicago, both of Ill.

[73] Assignee: OBF Industries, Inc., Downers Grove, Ill.

[21] Appl. No.: 09/027,040

[22] Filed: Feb. 20, 1998

[51] Int. Cl.⁷ ....................................................... B65B 1/04
[52] U.S. Cl. ............................................ 141/346; 141/366
[58] Field of Search .................................. 220/254, 373; 215/311, 314; 141/346, 348, 349, 366, 363–365, 114, 98

[56] References Cited

U.S. PATENT DOCUMENTS

| | | |
|---|---|---|
| D. 389,964 | 1/1998 | Lewandowski et al. . |
| 2,859,932 | 11/1958 | Mackal . |
| 2,888,949 | 6/1959 | Evans . |
| 2,926,934 | 3/1960 | Gill . |
| 3,307,598 | 3/1967 | Lowenthal . |
| 5,058,636 | 10/1991 | Simmel et al. . |
| 5,096,158 | 3/1992 | Burdick et al. . |
| 5,133,703 | 7/1992 | Boehringer et al. . |
| 5,156,823 | 10/1992 | Hori et al. . |
| 5,185,007 | 2/1993 | Middaugh et al. . |
| 5,213,309 | 5/1993 | Makishima ............................... 141/346 |
| 5,224,527 | 7/1993 | McCunn et al. . |
| 5,234,419 | 8/1993 | Bryant et al. . |
| 5,238,582 | 8/1993 | Hori et al. . |
| 5,279,602 | 1/1994 | Middaugh et al. . |
| 5,391,351 | 2/1995 | Kaufman . |
| 5,533,553 | 7/1996 | Vesborg .................................... 141/364 |
| 5,549,585 | 8/1996 | Maher et al. . |
| 5,584,825 | 12/1996 | Smith . |
| 5,635,196 | 6/1997 | Murphy . |

*Primary Examiner*—Steven O. Douglas
*Assistant Examiner*—J P Neddie
*Attorney, Agent, or Firm*—Tilton Fallon Lungmus & Chestnut

[57] ABSTRACT

A delivery system for dispensing controlled amounts of liquid or powder has two slidingly engaged parts which are held together as a single unit. The system is closed by pushing one of the two parts toward the other until a valve plug in the upper part of the system is received within an aperture of a valve seal membrane in the lower part of the system. The system is opened by pulling one part of the system away from the other using the sliding engagement means so that the valve plug exits the aperture in the valve seal membrane. Interior contoured walls prevent undesired collection of powder within the system, the relative orientation of the two parts of the system is adjustable to control the rate of flow of powder, and the system is particularly suitable for introducing powdered desiccants into medical waste containers without exposing the contents of the waste containers to the surrounding environment.

14 Claims, 2 Drawing Sheets

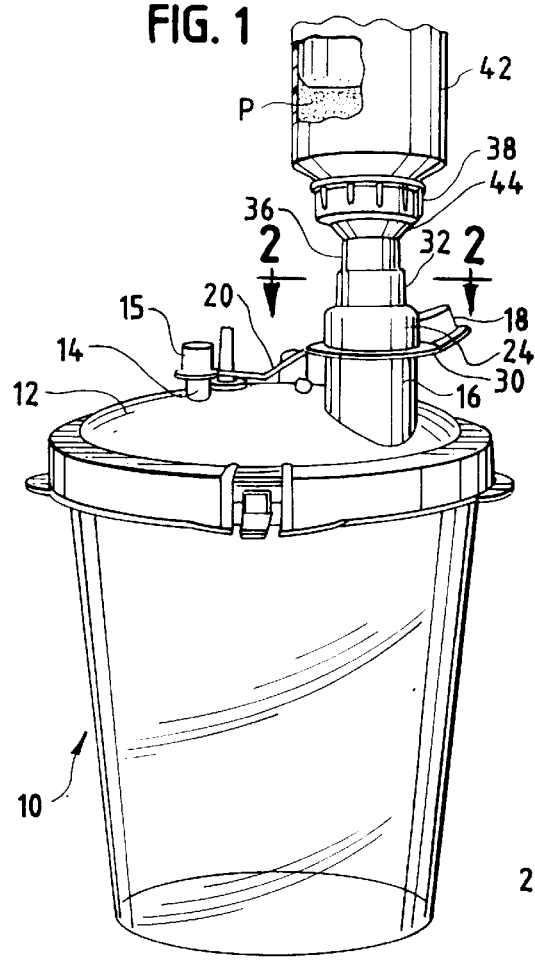
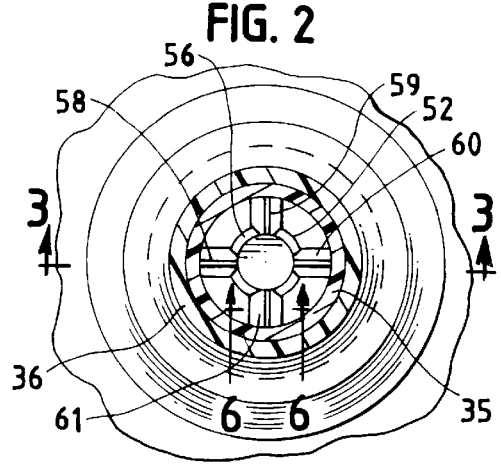
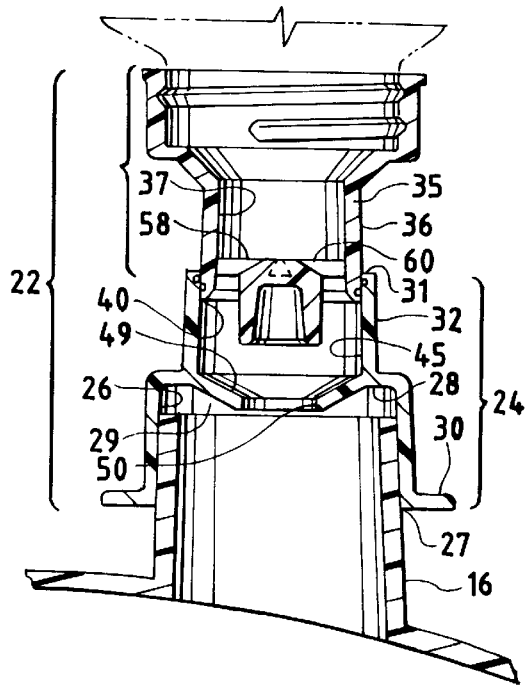
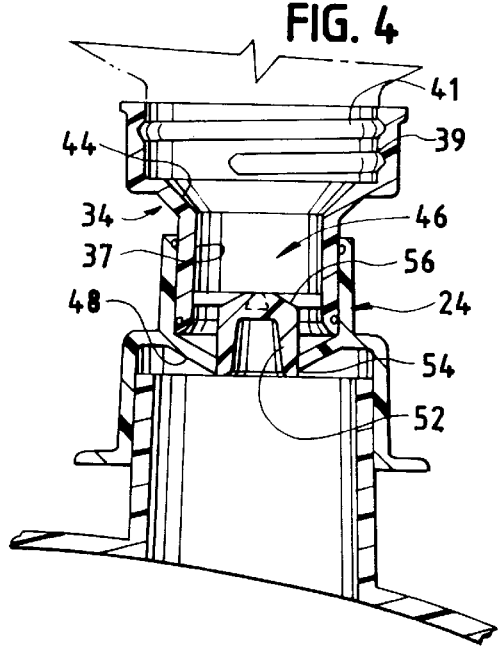
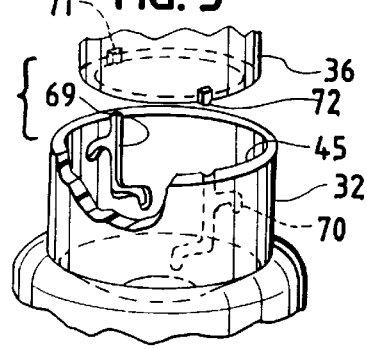

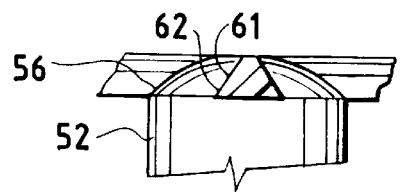
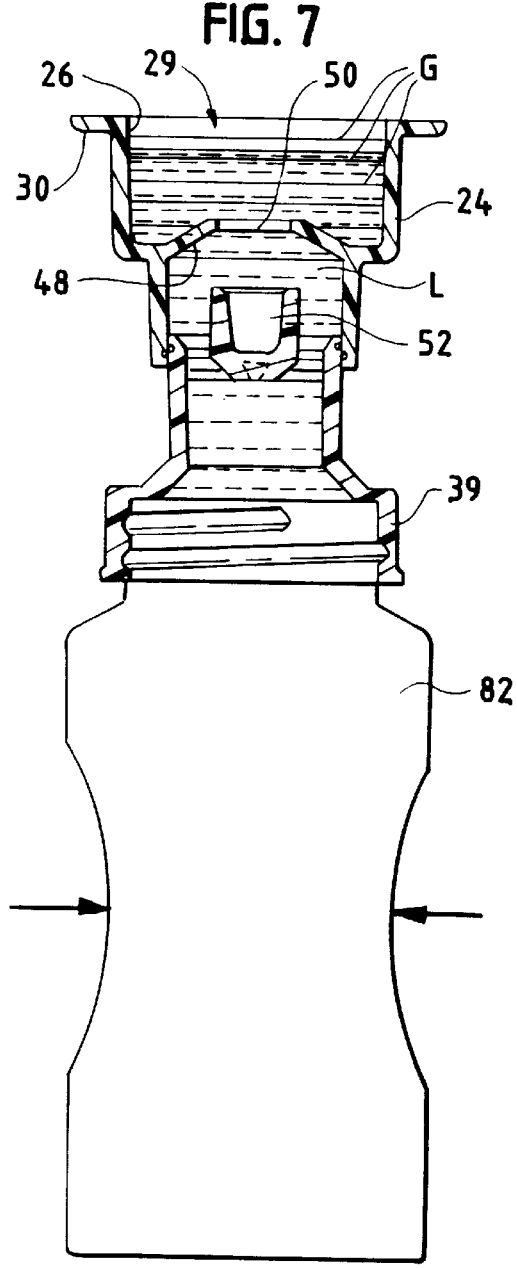
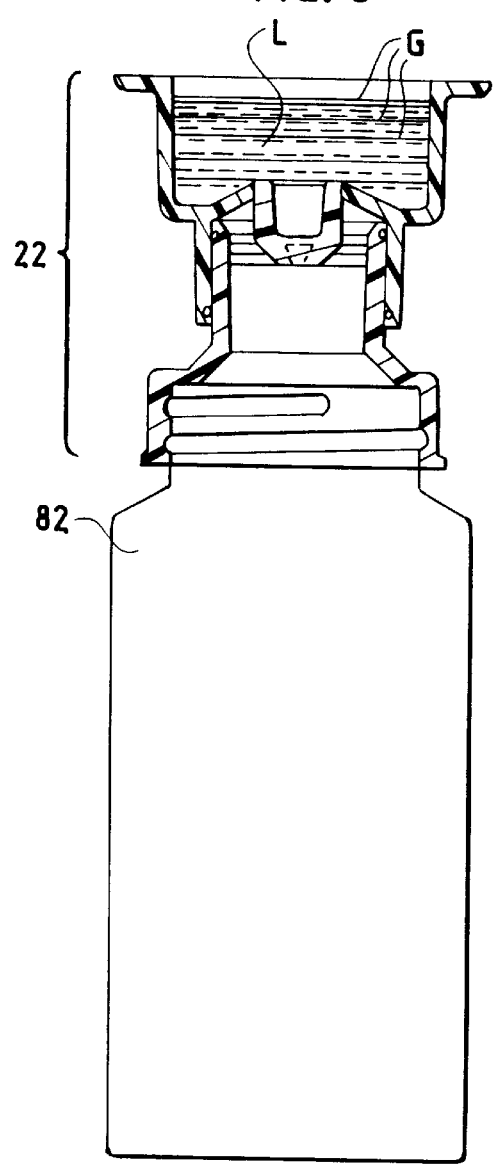

CLOSED DELIVERY SYSTEM

FIELD OF THE INVENTION

This invention relates generally to the field of introducing additives to medical waste containers and, more specifically, to a device for introducing powdered desiccants into sealed medical waste containers without exposing the contents of the medical waste containers to the surrounding environment. It is recognized, however, that the device of the present invention has versatile uses not limited to the field of medical waste treatment, in that the device can also be used effectively for dispensing controlled amounts of liquids, such as medicine, mouth wash, eye wash, or cleaning solution.

BACKGROUND

In order to reduce risk of infection to health care professionals from potentially harmful bacteria present in various forms of liquid waste removed from a patient, such as blood, it is generally well-known to disinfect, as well as solidify, the liquid waste products. A suitable additive for both disinfecting and gelling liquid medical wastes is described in U.S.. Pat. No. 5,635,196, and marketed under the name PremiCide™, and carries Environmental Protection Agency Reg. No. 59839-1. PremiCide™ is available as a granulated powder. When a sufficient quantity is added to liquid medical waste, the liquid waste is rendered less hazardous due to the disinfectants in the powder, and safer to dispose of in its now-gelatinized state.

It is desirable to introduce desiccants, such as PremiCide™, into a suction canister (which, for clarity shall be referred to herein as a "medical waste container" or simply a "waste container") without disturbing the sealed condition under which such liquid waste is typically collected and stored. Exposing the contents of the liquid waste to the atmosphere surrounding the waste container risks airborne contamination of health care professionals in the vicinity, and spillage of the liquid waste inside the waste container.

Various attempts have heretofore been offered to introduce desiccants into a closed medical waste container. For example, Smith, U.S. Pat. No. 5,584,825, discloses a system for adding granulated powder immobilizing agents to a vacuum sealed medical waste container using an adapter having a circular area with score lines to facilitate the rupture of the circular area upon application of pressure to the base of a vessel holding the powdered material. Once the circular area is ruptured, the powder flows into the medical waste container. However, this system suffers from the drawback that there is no way to re-seal the circular area, and thus the vessel containing the powder must remain connected to the medical waste container to maintain the vacuum seal. Also, the delivery system shown in Smith only operates when there is negative pressure or suction to draw the powdered waste treatment material through the delivery system and into the waste container. As such, any interruptions in the suction causes the waste treatment material to stop flowing into the medical waste container. In addition, if such a closure delivery system were utilized while lead tubes were still connected to the waste container, the suction can undesirably draw powdered desiccants into the lead tubes, thus clogging the lead tubes and rendering the lead tubes ineffective for future use.

Middaugh et al, U.S. Pat. No. 5,185,007, describes various systems for introducing powdered desiccants to liquid medical waste containers. Several of the systems described therein store the waste treatment material in a reservoir in the form of a pouch which is broken in order to start the introduction of powder into the waste container. One of the embodiments describes a floating plug that is pushed into the liquid waste in order to commence the flow of the powder. However, none of the systems are capable of maintaining the vacuum seal after a supply of the powdered waste treatment material is removed from the system. Also, once the supply of powder is used, no more powder can be added to the system without compromising the integrity of the vacuum seal and exposing liquid waste inside the container to the surrounding environment.

Another system for the addition of powdered waste treatment to liquid waste containers is described in Bryant et al., U.S. Pat. No. 5,234,419, which shows a reservoir in the form of a canister that moves freely within the sealed container. The canister stores powdered waste treatment material. The canister is opened by manipulating the flexible liner of the waste container and removing the end caps of the canister. Such a system cannot be used with solid waste containers, and presents a significant risk of catastrophically puncturing the waste container when removing the end caps of the canister.

A further shortcoming of various earlier devices for introducing powdered waste treatment into waste collection containers has been the inability of such devices to prevent powder from undesirably collecting within the device. Collection of powder is undesired, as it may have a tendency to inhibit the flow of powder into the waste container or may prematurely stop the flow of powder altogether. Also, it wastes powdered material that remains trapped in the device, instead of flowing into the medical waste container. Powder inside the device can collect on any flat, horizontal surfaces in the interior of the device. Yet another drawback of earlier waste treatment delivery systems has been the inability to control the rate of flow of powdered waste treatment material into a waste container. When introducing a solidifying powdered waste treatment into 3000 cc fluid liner medical waste canisters, the powder must be dispensed slowly in order to avoid gel block.

Therefore, it is an object of the present invention to provide a reliable closure device that maintains the integrity of a sealed medical waste container before, during, and after addition of powdered desiccants to the liquid waste within the container. It is another object of the present invention to provide a safe way of opening and closing the closure device to selectively allow or stop the flow, as well as control the rate of flow, of powdered waste treatment material into a medical waste container. It is yet another object of the invention to provide a closure device that can be attached and removed from a bottle or similar vessel containing a supply of waste treatment material. It is a further object of the invention to provide a way of securely connecting the closure device to a variety of sizes of pour spout ports on medical waste container lids. An additional object of the present invention is to minimize the existence of flat, horizontal ridges inside the device so as to eliminate the undesired collection of powdered waste treatment material inside the device. The manner in which these and other objects of the present invention are accomplished will become clear from the following Summary of the Invention, the Detailed Description of the Invention, and the drawings.

SUMMARY OF THE INVENTION

The closure device of the present invention is a two-part device having a lower portion for engaging a standard-sized pour spout or port on the lid of a medical waste container, and an upper portion for attachment to a bottle or similar vessel containing powdered waste treatment material. The upper portion of the closure device has a threaded neck which directly engages a threaded opening of the source of waste treatment material, i.e. the bottle or similar vessel. The upper portion also includes an inner sliding tube, which slides within a corresponding outer sliding tube of the lower portion of the closure device. An inclined wall of the upper portion extends between the threaded neck and the inner sliding tube. This inclined wall assists in directing powdered waste treatment material downward toward the waste container.

The upper portion of the closure device also includes a valve plug that preferably extends downwardly from four integral support posts or arms connecting the valve plug to the inner sliding tube. The valve plug has a dome-shaped top, which cooperates with the inclined wall to help direct powder downwardly toward the waste container. The contours of the inner walls of both the upper and lower portions of the closure device of the present invention are all intended to prevent the undesired collection of powder inside the closure device. Instead of collecting on any flat, horizontal ridges inside the closure device, powdered waste treatment material contacting the sloped or domed interior surfaces of the present invention falls downward toward the waste container. Even the integral support posts for the valve plug preferably have contoured, angled tops to avoid the collection of powder thereon.

The lower portion of the closure device includes a waste container engagement port in the form of an annular throat. The annular throat is preferably tapered inwardly from a widest diameter which will accommodate a 33 ml pour spout at a lower-most open end of the throat, to a somewhat narrower diameter to accommodate a 30 ml pour spout at the upper end of the annular throat. This tapering provides a universal engagement port so the annular throat can fit over a variety of pour spout ports of medical waste container lids. The closure device can thus be used with a variety of different waste containers available from different manufacturers. Another benefit of the taper is that it allows the annular throat to securely lock on the pour spout port of a waste container lid, reducing the possibility of the closure device becoming prematurely dislodged from the container lid during use. The lower portion of the closure device also includes the outer sliding tube that extends upwardly from the annular throat.

An inner wall of the outer sliding tube preferably includes an annular rib that serves to prevent the inner sliding tube from completely exiting the outer sliding tube via a corresponding annular rib on the outer wall of the inner sliding tube. By preventing the inner sliding tube from completely exiting the outer sliding tube, the closure device is kept together as a single unit, even though it has two parts.

A valve membrane separates the annular throat from the outer sliding wall of the lower portion of the closure device. The valve membrane includes an aperture that is sized to receive the valve plug of the upper portion of the closure device when the device is in a closed position. When the valve plug is seated in the aperture of the valve membrane, waste treatment powder is prevented from flowing into the annular throat and into the medical waste container attached thereto. Preferably, the valve membrane is sloped downwardly toward the open end of the annular throat to facilitate the flow of the powder through the aperture when the closure device is in an open position. The valve membrane is an integral part of the lower portion of the closure device.

The closure device is closed by sliding the upper portion downward toward the lower portion at least until the valve plug is received by the aperture in the valve membrane. The closure device is preferably dimensioned so that by pushing downward on the upper portion until the end of the inner sliding wall contacts the valve membrane, it is assured that the valve plug is properly seated in the aperture of the valve membrane. Once a bottle of powdered desiccant is supplied to the threaded neck on the upper portion and the annular throat of the closure device is secured to a medical waste receptacle, the closure device can then be opened to introduce powder into the waste receptacle by reversing the operation, i.e. by pulling upward on the upper portion of the closure device until the valve plug exits the aperture in the valve membrane.

The rate of flow of powdered waste treatment material is controlled by adjusting the distance that the upper portion is pulled away from the lower portion. For example, to achieve a slow rate of flow, the upper portion is pulled upward until there is only a narrow gap between the valve plug and the aperture in the valve membrane. For faster flow, the upper portion is pulled farther away from the lower portion.

The present invention achieves a closure device that can be selectively opened and closed to control the flow of powdered desiccants for disinfecting and gelling liquid waste material in sealed containers without exposing the contents of the containers to the surrounding atmosphere. Advantageously, once the closure device of the present invention is opened, gravity (rather than suction) is used to draw the powdered waste treatment material into the medical waste container.

The closure device of the instant invention may instead be used for dispensing controlled volumes of liquid. To do so, one attaches the threaded neck to a bottle containing the liquid to be dispensed, opens the closure device, and squeezes the bottle to introduce liquid into the annular throat of the closure device. Once the desired volume of liquid is drawn into the annular throat, the closure device can be closed to seal the bottle, and the liquid in the annular throat can be used.

DESCRIPTION OF THE DRAWINGS

FIG. 1 is a perspective view of the closure device of the present invention in engagement with a lid of a standard medical waste container and a bottle of powdered waste treatment material.

FIG. 2 is a horizontal cross-sectional view of the closure device, taken along lines 2—2 of FIG. 1.

FIG. 3 is a vertical cross-section of the closure device of the present invention in an open position, shown in engagement with a lid of a standard medical waste container, with a bottle attached thereto shown in phantom lines.

FIG. 4 is a vertical cross-section of the closure device of the present invention in a closed position, shown in engagement with a lid of a standard medical waste container, with a bottle attached thereto shown in phantom lines.

FIG. 5 is a fragmentary perspective view, partially broken away, of an alternative embodiment of the closure device, showing a locking mechanism by which the device can be locked in either the open or closed position. The valve plug and valve plug support arms are omitted for clarity.

FIG. 6 is a fragmentary cross-sectional view of one of the valve plug support arms, taken along lines 6—6 of FIG. 2, shown attached to the dome-shaped top of the valve plug.

FIG. 7 is a front plan view of the present invention being used to dispense liquid, with the closure device shown in cross-section and in an open position.

FIG. 8 is a front plan view of the present invention being used to dispense liquid, with the closure device shown in cross-section and in a closed position.

DETAILED DESCRIPTION OF THE INVENTION

Preferred Embodiment

A medical waste container 10 is used by health care professionals to store various infectious liquid human waste products, such as blood. In order to keep potentially harmful liquid waste from contaminating individuals handling or coming in close proximity to the waste container 10, liquid medical waste is typically collected using suction in a vacuum-sealed system. As shown in FIG. 1, the medical waste container 10 has a waste container lid 12, an inlet port 14, an inlet port cap 15, a pour spout, also called an outlet port 16, and an outlet port cap 18. The inlet and outlet port caps are preferably integrally attached to the waste container lid 12, such as by a flexible strip 20.

The closure device 22 of the present invention is most clearly shown in FIGS. 3 and 4. The closure device 22 includes two principal parts, a container port engagement member 24 and a waste treatment bottle engagement member 34. The container port engagement member 24 has an inner wall 26, which is preferably tapered from an inner diameter to accommodate a 33 ml pour spout port at the open end 27 of the container port engagement member 24, to an inner diameter that accommodates a 30 ml pour spout port at the top wall 28 of the container port engagement member 24. This tapered opening is an annular throat 29, defined by the inner wall 26 and the top wall 28 of the container port engagement member 24. The annular throat allows the closure device 22 to be used with a variety of standard-sized pour spouts of medical waste container lids typically found in the industry. It is believed that the tapered shape of annular throat 29 allows for its virtually universal use with approximately 99% of the lids of medical waste canisters available on the market in the United States today.

Preferably, the container port engagement member 24 includes an annular grip rim 30 projecting horizontally outwardly from the open end 27. The grip rim 30 provides a health care professional with a convenient means of holding the closure device 22 in a tight sealed relationship with the outlet port 16 of the container lid 12 while opening or closing the closure device 22, as is explained in greater detail below. An outer sliding tube 32 extends upwardly from the top wall 28 and is an integral part of the container port engagement member 24. The outer sliding tube 32 includes an internally projecting annular rib 33 (see FIG. 4).

The second principal part of the closure device 24, the waste treatment bottle engagement member 34, includes an integral, downwardly extending portion referred to as the inner sliding tube 35. The inner sliding tube 35 has an outer wall 36 and an inner wall 37. The inner sliding tube 35 slidingly engages the outer sliding tube 32 so the closure device 24 can be opened or closed. The outer wall 36 preferably includes an externally projecting annular rib 38 adjacent the lowermost end 40 of the inner sliding tube 35. The annular ribs 33, 38 cooperate with one another to hold the waste treatment bottle engagement member 34 together with the container port engagement member 24 so as to hold the closure device 22 together as a single unit, even when the closure device 22 is in its opened position with the inner sliding tube 35 fully retracted from the outer sliding tube 32.

It will be appreciated by those of ordinary skill in the art that instead of a full annular rib 33 extending all the way around the inner rim of the outer sliding tube 32, the closure device 22 may be kept together as one piece even if only arcuate sections of annular ribs are provided. Such arcuate ribs would still get caught by the annular rib 38 on the outer wall 36 of the inner sliding tube 35, preventing the inner sliding tube 35 from fully exiting the outer sliding tube 32. Alternatively, the annular rib 33 of the outer sliding tube 32 could be a full rib extending all the way around the inner rim, and one can provide only arcuate sections of annular ribs on the outer wall 36 of the inner sliding tube 35 instead of the full annular rib 38. In either case, the closure device 22 is still maintained as a single unit with two moving parts.

The closure device 22 is connected to a source of powdered waste treatment material P, such as a bottle 42 or similar vessel having a threaded opening, by means of a threaded neck 39 at the upper end of the waste treatment bottle engagement member 34. The threads 41 of the threaded neck 39 allow for secure, threaded engagement with the threaded opening of a bottle 42. The waste treatment bottle engagement member 34 includes an inwardly, i.e. downwardly, sloped neck region 44 intermediate the threaded neck 39 and the inner sliding tube 35. The sloped neck region 44 helps direct powdered waste treatment material downwardly, toward the container port engagement member 24, and helps prevent undesired collection of powder on inside surfaces of the closure device, as was typically encountered by flat, horizonal surfaces inside closure devices found in the prior art.

A valve seal membrane 48 is located inside the container port engagement member 24 intermediate the annular throat 29 and the outer sliding tube 32. The valve seal membrane 48 extends inwardly from the inner wall 45 of the outer sliding tube 32. For molding purposes, the valve seal membrane 48 may be formed as an integral inward extension of the top wall 28 of the container port engagement member 24. As shown in FIGS. 3 and 4, the valve seal membrane 48 is located adjacent the top wall 28 of the container port engagement member 24, and is sloped downwardly toward the open end 27. The valve seal membrane 48 includes an aperture 50, which is sized to receive a valve plug 52 located on the waste treatment bottle engagement member 34. The downward slope of the top 49 of the valve seal membrane 48 helps direct powdered waste treatment material downwardly toward aperture 50 when the closure device 22 is in an open position, and helps prevent undesired collection of powder on inside surfaces of the closure device 22, similarly to the sloped neck 44.

As shown in FIG. 2, the valve plug 52 is an integral part of the waste treatment bottle engagement member and is attached to the lower end of the inner sliding tube 35 by a plurality (preferably four) of valve plug support arms 58, 59, 60, 61. The valve plug 52 is a cylindrical member having a dome-shaped top 56, which serves to divert powder downward toward the valve seal membrane 48 and avoid the undesired collection of powdered waste treatment material P on top of the valve plug 52. The top 62 of each of the valve plug support arms 58, 59, 60, 61 has a contoured, angled shape, as best seen in FIG. 6, which also helps divert powdered material downward toward the valve seal membrane 48, rather than undesirably collecting powder on top of the valve plug support arms.

The closure device 22 is opened by pressing downward on the grip rim 30 while pulling upward on the waste treatment engagement member 34 so that the inner sliding tube 35 retracts from the outer sliding tube 32. FIG. 3 shows the closure device 22 in an opened position. In order to close the closure device 22, one presses downward on the waste treatment engagement member 34 toward the container port engagement member 24 until the valve plug 52 is received in the aperture 50 of the valve seal membrane 48. To ensure the closure device 22 is fully closed, the waste treatment engagement member 34 is preferably pushed downward until the lowermost end 40 of the inner sliding tube 35 contacts the top 49 of the valve seal membrane 48. When this is accomplished, the user will hear an audible "snap," indicating the valve plug 52 has been received within the aperture 50. The snap is produced because the valve plug 52 is preferably sized slightly larger than the aperture 50 so that a press fit occurs each time the closure device 22 is closed. As seen in FIG. 4, when the closure device 22 is fully closed with the lowermost end 40 of the inner sliding tube 35 in contact with the top 49 of the valve seal membrane 48, a small tip portion 54 of the valve plug 52 extends downwardly of the valve seal membrane 48.

In order to control the rate of flow of powdered waste treatment material P into the waste container 10, the height of the waste treatment engagement member 34 can be adjusted relative to the container port engagement member 24. To achieve a relatively slow rate of flow of powdered waste treatment material P, the user would pull upward on the waste treatment engagement member 34 until the inner sliding tube 35 retracts only enough from the outer sliding tube 33 so that the valve plug 52 is spaced just a small distance above the top 49 of the valve seal membrane 48. To increase the rate of flow, the user would pull the waste treatment engagement member farther upward, so the inner sliding tube 35 retracts farther from the outer sliding tube 34. As a result, the valve plug 52 is spaced a greater distance from the top 49 of the valve seal membrane 48, and gravity causes more powdered waste treatment material P to fall through the aperture 50, i.e. the powder flows at a faster rate.

When the closure device 22 is in a closed condition as shown in FIG. 4, and an opened bottle containing waste treatment material is attached to the threaded annular throat 29, a waste treatment containment zone 46 is provided within the closure device 22 to temporarily store powdered waste treatment material until the closure device 22 is opened. The waste treatment containment zone 46 is defined by the top 49 of the valve seal membrane 48, the inner wall 37 of the inner sliding tube 35, an inner wall of the inwardly sloped neck region 44, and the valve plug 52. Unlike reservoirs used to store powdered waste treatment material in the prior art, the containment zone 46 can be re-closed and re-filled while maintaining the integrity of a closed, sealed environment so that no liquid waste material is exposed to the surrounding atmosphere.

The compact size of the closure device 22, particularly when it is in its closed position, facilitates easy packaging of the closure device 22. Desirably, the closure device 22 can be shrink-wrap packaged together with a bottle 42 containing a powdered waste treatment material, such as the desiccant Permicide™, within the underside of a medical waste container lid 12. In this manner, health care professionals may be provided with a convenient, ready-to-use waste treatment kit.

Alternate Embodiment

As shown in FIG. 5, an alternate embodiment of the present invention permits the closure device 22 to be locked in either the open or closed position in order to prevent the premature opening or closing of the closure device 22. The locking means takes the form of a pair of locking tabs 71, 72 provided on the outer wall 36 of the inner sliding tube 35, and a pair of corresponding locking channels 69, 70 provided in the inner wall 45 of the outer sliding tube 32. The locking channels 69, 70 may continue all the way to the uppermost end 31 of the outer sliding tube 32, as shown in FIG. 5, if it is desired to have the ability to remove the waste treatment bottle engagement member 34 from the container port engagement member 24, or alternatively, the locking channels 69, 70 may terminate below the uppermost end 31 so that the two parts of the closure device 22 are always held together as a single unit.

It will be understood by those of ordinary skill in the art that the locking tabs 71, 72 could alternatively be provided as internal extensions of the inner wall 45 of the outer sliding tube 32, with corresponding locking channels 69, 70 being provided on the outer wall 36 of the inner sliding tube 35. The locking channels 69, 70 each include a main vertical track which branches off into two horizontal tracks. The upper horizontal tracks are used for locking the closure device 22 in the open position, while the lower horizontal tracks are used to lock the closure device 22 in the closed position. Vertical dwells at the ends of each of the horizontal tracks will serve to produce an audible "snap" if the locking tabs are slightly larger than the horizontal tracks, so the user can tell when the closure device 22 is locked.

Method of Use

The closure device 22 of the present invention may advantageously be used to add powdered desiccants to a medical waste container 10 either before or after liquid waste products are deposited in the waste container. Furthermore, because the closure device 22 depends on gravity to draw powdered waste treatment material P into the waste container 10, the device may be used with or without suction.

A supply of powdered waste treatment material P, such as a bottle 42, is connected to the threaded neck 39 of the waste treatment bottle engagement member 34 by screwing the threaded opening of the bottle 42 into the threads 41 of the threaded neck 39. It will be appreciated by those of ordinary skill in the art that the threaded neck 39 permits the closure device 22 to be used with a variety of sizes of vessels or bottles 42 that could be used as a source of powdered waste treatment material P, such as 500 cc, 1,200 cc, 1,500 cc, 2,000 cc, 3,000 cc, and 10,000 cc vessels, provided the vessel had a threaded opening sized to threadedly couple with the threaded neck 39. It will be further appreciated that an adapter may be used to accommodate an even greater variety of vessels in the threaded neck without departing from the scope of the present invention. Alternatively, instead of a threaded neck, the waste treatment engagement member 34 may have a smooth neck so as to slidingly engage bottles or other vessels lacking threaded openings.

For most bottles 42, and particularly for larger sized bottles 42 of powdered waste treatment material P, such as 2,000 cc, 3,000 cc, or 10,000 cc bottles, it is preferable to install the waste treatment engagement member 34 of the closure device 22 onto the bottle 42 first, prior to installing the closure device 22 on the container lid 12. In this manner, the bottle 12 need not be inverted until after the bottle 12 has first been secured to a closed closure device 22. This advantageously avoids spillage of the waste treatment material P.

The preferred method of use of the closure device 22 with a medical waste container 10 is to remove the outlet port cap 18 from the pour spout or outlet port 16 on the waste container lid 12. Next, firmly push the container port engagement member 24 of the closure device 22 over the outlet port 16 so the annular throat 29 is firmly secured to the outlet port 16. Advantageously, the tapered shape of the inner wall 26 of the annular throat 29 accommodates a variety of sizes of pour spout ports found on most medical waste container lids. The closure device 22 should initially be in a closed position when installed on the bottle 42, with the waste treatment bottle engagement member 34 pushed as far downward toward the container port engagement member 24 as it will go. The sliding tube 36 should be completely received within the outer sliding tube 32, with the lowermost end 40 in contact with the top 49 of the valve seal membrane 48 to ensure the valve plug 52 is received within the aperture 50. An audible "snap" sound can be heard when the valve plug 52 is received within the aperture 50.

The closure device 22 should be installed on the container lid 12 before liquid waste is deposited in waste container 10, so that once the liquid waste is deposited, a closed system can be maintained. After the liquid waste is deposited in the waste container 10, tubing can be disconnected from the inlet port 14, the inlet port cap 15 should be firmly secured onto the inlet port 14, and any vacuum or suction ports used to draw the liquid waste into the waste container 10 can be closed.

In order to start the flow of powdered waste treatment material P into the waste container 10, the user firmly grasps the grip rim 30 and pushes the grip rim 30 downwardly toward the container lid 12 in order to maintain a tight seal on the outlet port 18. Simultaneously, the user pulls upward on the waste treatment bottle engagement member 34 until the valve plug 52 is pulled out of the aperture 50 in the valve seal membrane 48. To adjust the rate of flow, the waste treatment bottle engagement member 34 is raised (to increase the rate of flow) or lowered (to decrease the rate of flow).

Once the liquid waste has been safely solidified by the powdered desiccant, the closure device 22 and the bottle 42 may be removed from the waste container lid 12. However, in the event the bottle 10 is entirely emptied before a sufficient amount of waste treatment material P has been added to the waste container 10, the user can re-close the closure device 22, replace the bottle 10 with a new full bottle containing a fresh supply of waste treatment material P, then re-open the closure device 22, all without exposing the liquid waste to the environment surrounding the waste container 10. If desired, the closure device 22 may also be used while negative pressure or suction is acting on the waste container. Because the present invention can be used with or without suction, it allows for powdered waste treatment material P to be added to a medical waste container 10 either before or after liquid waste is deposited into the container.

While the primary intended use of the closure device 22 is for introducing powdered waste treatment into a sealed waste container, an effective alternate use of the present invention is for dispensing a controlled amount of liquids, such as medicine, mouth wash, eye wash, or cleaning solution. Instead of installing the closure device 22 onto a bottle containing powder, the device can be installed with the threaded neck 39 secured to a bottle 82 containing liquid L to be dispensed, as shown in FIGS. 7 and 8. The closure device 22 can be opened by raising the waste container port engagement member 24 until the valve seal membrane 48 separates from the valve plug 52.

To dispense liquid L, once the closure device is opened, the user squeezes the bottle 82, as indicated by the arrows in FIG. 7, until a desired volume of liquid L flows from the bottle 82 into the annular throat 29. It will be appreciated by those of ordinary skill in the art that the inner wall 26 of the annular throat 29 may be provided with gradiated indicia G or similar volume markings to assist a user in measuring a desired volume of liquid L. If too much liquid L is added to the annular throat 29, then the user slowly releases the grip on the bottle, and the closure device 22 allows excess liquid L to flow back into the bottle. Once the desired level of liquid L is reached, the closure device is closed, re-sealing the bottle, and the liquid L in the annular throat 29 may be used. For example, if the liquid is medicine, the recipient could bring the bottle 82 and closure device 22 up to his or her mouth, place his or her lips on the grip rim 30, and drink the liquid L using the annular throat 29 as a cup. If the liquid were an eye wash, the annular throat 29 and the bottle 82 could conveniently be brought directly up to the eye and inverted for the liquid to clean the eye.

Those of ordinary skill in the art will thus appreciate that the practical applications for the closure device of the present invention are not intended to be limited to the field of treatment of liquid medical waste, and that the closure device can also be used for controlling the flow of any kind of bottled fluid. It will also be appreciated by those skilled in the art that although the invention has been described with respect to certain embodiments thereof, it is not intended to be limited thereto and that changes and modifications can be made therein within the scope of the appended claims.

We claim:

1. A closure device for selectively introducing waste treatment material into a waste container, said closure device comprising:

means for connecting said closure device to a source of waste treatment material;

means for connecting said closure device to a waste container, said means for connecting said closure device to a waste container being a tapered cylindrical opening of a container port engagement member of said closure device;

means for selectively opening said closure device to allow said waste treatment material to flow into said waste container; and means for selectively closing said closure device to prevent the flow of waste treatment material into said waste container.

2. A closure device for selectively introducing waste treatment material into a waste container, said closure device comprising:

a waste treatment source engagement member having a threaded neck at a first end thereof;

an inner sliding tube extending downwardly from said threaded neck, said inner sliding tube having an inner wall and an outer wall;

a valve plug extending downwardly from said inner sliding tube, said valve plug being attached to said inner wall of said inner sliding tube by a plurality of valve plug support arms;

a waste container port engagement member having an annular throat for coupling with a port of a waste container lid, said annular throat having a lower open end and an upper end;

an outer sliding tube extending upwardly from said upper end of the annular throat, said outer sliding tube having an inner wall and an outer wall and said inner sliding tube being slidably engaged with said outer sliding tube; and a valve seal membrane extending inwardly from said inner wall of said outer sliding tube, said valve seal membrane including an aperture for receiving said valve plug when the closure device is in a closed position.

3. The closure of device of claim 2, wherein said valve seal membrane is sloped downwardly toward said lower open end of the annular throat.

4. The closure device of claim 2, wherein said annular throat is gradually tapered inwardly from said lower open end to said upper end thereof, whereby said closure device can accommodate a variety of sizes of waste canister ports.

5. The closure device of claim 2, wherein said annular throat includes a grip rim extending outwardly from said lower open end of said annular throat.

6. The closure member of claim 2, said waste treatment source engagement member further including a downwardly and inwardly directed sloped region intermediate said threaded neck and said inner sliding tube.

7. The invention of claim 6, wherein an upper side of said sealing membrane, the inner wall of said inner sliding tube, an inner wall of said downwardly and inwardly directed sloped region, and said valve plug define a waste treatment containment zone wherein powdered waste treatment material is stored until said closure device is opened.

8. The closure member of claim 2, said valve plug comprising a cylindrical member having a lower end and a dome-covered upper end, said lower end being received within said aperture in said valve seal membrane when said closure device is in the closed position.

9. The invention of claim 8, said dome-covered upper end of said valve plug deflecting waste treatment material downwardly toward said sealing membrane.

10. The invention of claim 8, wherein a lower end of said inner sliding tube contacts an upper wall of said sealing membrane when said closure device is in the closed position.

11. The closure device of claim 2, further including means for locking said closure device in an open position or in the closed position.

12. The closure device of claim 2, said inner sliding tube including a rib extending outwardly from the outer wall thereof at a lowermost end of the inner sliding tube, and said outer sliding tube including a rib extending inwardly from the inner wall of the outer sliding tube at an uppermost end of the outer sliding tube, said ribs preventing said waste treatment source engagement member from separating from said waste container engagement member.

13. The closure device of claim 12, including means for controlling the rate of flow of said waste treatment material into said waste container.

14. The closure device of claim 13, wherein said means for controlling the rate of flow comprises pulling said waste treatment container engagement member upwardly to increase the rate of flow and pushing said waste treatment container engagement member downwardly to decrease the rate of flow.

\* \* \* \* \*

UNITED STATES PATENT AND TRADEMARK OFFICE
CERTIFICATE OF CORRECTION

PATENT NO. : 6,032,705
DATED : March 7, 2000
INVENTOR(S) : William J. Murphy and Leon M. Levy It is certified that error appears in the above-indentified patent and that said Letters Patent is hereby corrected as shown below:

On the title page, in the second column of References Cited, insert:

-- 4,515,586    5/1985    Mendenhall et al.
   4,524,880    6/1985    Danielson et al. --

Signed and Sealed this

Fourteenth Day of November, 2000

Attest:

Q. TODD DICKINSON

*Attesting Officer*      *Director of Patents and Trademarks*